March 30, 1965    J. G. CROAD, JR    3,176,269
RING COUNTER CHECKING CIRCUIT
Filed May 28, 1962

INVENTOR.
JOHN G. CROAD JR.
BY John L. Jackson
ATTORNEY

United States Patent Office 3,176,269
Patented Mar. 30, 1965

3,176,269
RING COUNTER CHECKING CIRCUIT
John G. Croad, Jr., San Jose, Calif., assignor to International Business Machines Corporation, New York, N.Y., a corporation of New York
Filed May 28, 1962, Ser. No. 198,012
6 Claims. (Cl. 340—146.1)

This invention relates to checking circuits in general and more particularly to a device for checking the operation of a signal generator comprising a plurality of cascaded bistable stages.

Signal generators of the ring circuit type are generally comprised of a plurality of stages cascaded together with each stage including a bistable device. The bistable device may comprise a vacuum tube or transistor trigger circuit having two stable states designated as the ON or SET state and the OFF or RESET state. When a ring advance pulse is applied to the ring, the effect is to reset the bistable device which is on to the OFF state and to set the bistable device of the following stage to the ON state. Prior to the time that the following bistable device turns on and after the preceding bistable device is turned off, all of the devices in the ring are in the OFF state for a definite duration. This time is equal to the transition times of the two devices involved.

There are many sources of errors in the operation of a multi-stage signal generator such as a ring circuit. For instance, often a ring will advance more times than pulsed or may not advance at all when it is pulsed. Additionally, often all of the binary devices in the ring may be off, which condition will not be detected by associated circuitry or, indeed, the associated checking circuitry itself may be malfunctioning. The patent to Abzug, 3,017,620, issued January 16, 1962, accurately sets forth many of shortcomings or sources of difficulty in ring counter operation. Additionally, the Abzug patent sets forth many of the prior art attempts to alleviate or provide an indication of the malfunctioning of an associated ring circuit.

While the above mentioned patent presents a signifiicant contribution to the state of art of ring counter checking circuits, shortcomings arise when this checking circuit is utilized in certain applications. For instance, a sample pulse must be applied at junction 68 between ring advance pulses to determine whether the ring is operating properly. Additionally, while the checking circuit will detect a double advance, it will not detect a triple advance unless the sample reset pulse is made to occur after the desired stage has gone off and prior to the time that the third stage comes on. Moreover, in certain applications, it may be hours between ring advances in which case, if the sample reset pulse occurs a predetermined time after the ring has advanced, malfunction of a component occuring subsequent to the sample reset pulse will not be detected.

It is, therefore, an object of the present invention to provide a novel circuit for use in checking the operation of a cascaded multi-stage device.

Another object of the present invention is to provide a novel checking circuit which does not require any external timing other than the ring advance pulse applied to the associated ring.

Another object of the present invention is to provide a relatively simple, highly reliable, inexpensive checking circuit.

Another object of the present invention is to provide a checking circuit which will provide an error indication in the event that the associated signal generator advances more times than pulsed.

Another object of the present invention is to provide a checking circuit for use with an associated signal generator which will provide an error indication in the event that all of the binary devices in the associated signal generator are off.

Another object of the present invention is to provide a checking circuit for use with an associated signal generator which will provide an error indication in the event that the associated signal generator does not advance when pulsed.

Another object of the present invention is to provide a checking circuit which will provide an error indication in the event that the checking trigger used therein is not functioning properly.

Another object of the present invention is to provide a checking circuit which will provide an error indication of a component malfunction occurring at any time without regard to a specific sample time.

Other and further objects and advantages of the invention will be apparent from the following more particular description of the preferred embodiment of the invention, as illustrated in the accompanying drawings in which.

Briefly, the basic operation of a ring counter is such that an advance pulse turns all of the bistable devices in the ring to the OFF state. The change of state of the one bistable device that was on is sensed and used to turn the next bistable device in succession to the ON state, effectively advancing the ring. Prior to the time that the following bistable device turns on and after the preceding bistable device is turned off, all of the devices in the ring are in the OFF state for a definite duration. This time is equal to the transition times of the two devices involved. All of the bistable devices in the ring counter are tied to an OR circuit and thus, the transition signal appears as a pulse on the output of the OR circuit. The positive going edge of the advance pulse used to advance the ring is also used to turn a check trigger to the ON state. The positive going edge of the transition pulse appearing on the output of the OR circuit is used to turn the check trigger OFF. The duration of the advance pulse is such that it just encompasses the time required for the ring to advance one step. The output of the check trigger, the advance pulse and the transition pulse are employed in various combinations as inputs to three AND gates. An output from either of the three AND gates is indicative of an error in the operation of the associated ring.

Figure 1:
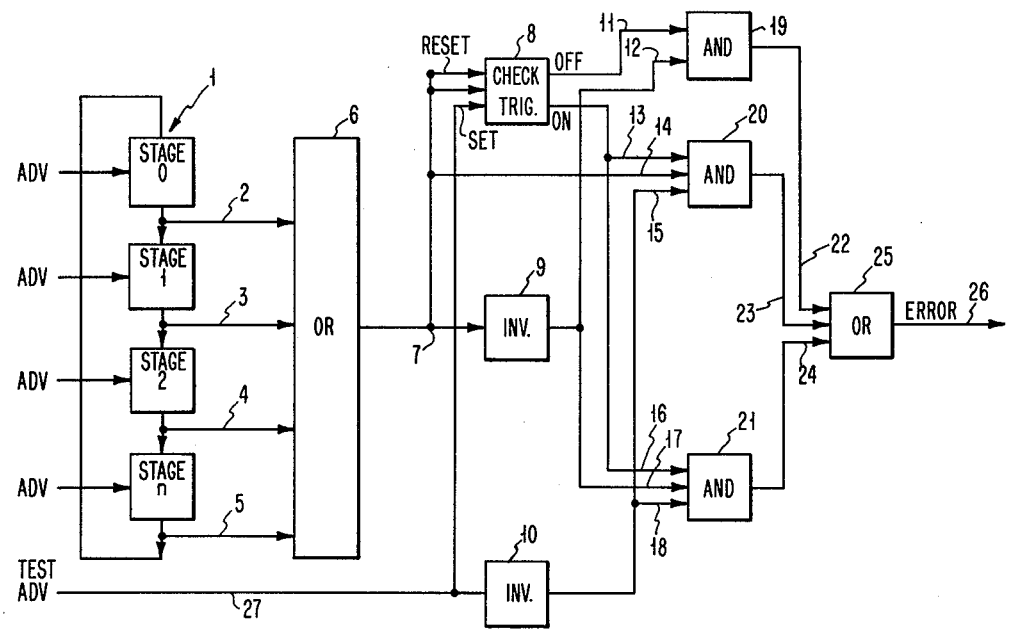
FIG. 1 is a schematic diagram of the herein described checking circuit.

Refer first to FIG. 1 which is a schematic diagram of the hereinafter described checking circuit. In FIG. 1 is shown a ring counter 1 which, as previously stated, is made up of a plurality of stages 0 through $n$, each comprising a bistable device. In operation, upon the receipt of an advance pulse along the ADV lines, the change of state of the one bistable device that was on is sensed and used to turn the next binary device in succession to the ON state thereby effectively advancing the ring. Prior to the time that the succeeding binary device turns on and after the time that the preceding binary device is turned off, all of the devices in the ring are off for a definite time which will hereinafter be referred to as the transition time or "transition pulse." The lines 2 through 5 leading from the plurality of cascaded stages upon which the transition pulse appears are connected to an OR gate 6. The output of the OR gate 6 is connected to junction 7 which is in turn connected to the binary connected inputs of check trigger 8, to one input 14 of three-term AND gate 20 and to the inverter 9.

A test advance line 27 is connected to inverter 10 and to the SET terminal of check trigger 8.

The ON line of check trigger 8 is connected to one term 13 of the AND gate 20 and to one term 16 of the AND gate 21. The OFF line of check trigger 8 is connected to one term 11 of AND gate 19. The output of inverter 9 is connected to one term 12 of AND gate 19 and to one term 17 of AND gate 21. The output of inverter 10 is connected to one term 18 of AND gate 21 and one term 15 of AND gate 20. The outputs of AND gates 19, 20 and 21 make up the inputs 22, 23 and 24 respectively to OR gate 25. The output of OR gate 25 is connected to the error line 26.

Figures 2, 2A, 2B, 2C, 2D, 2E:
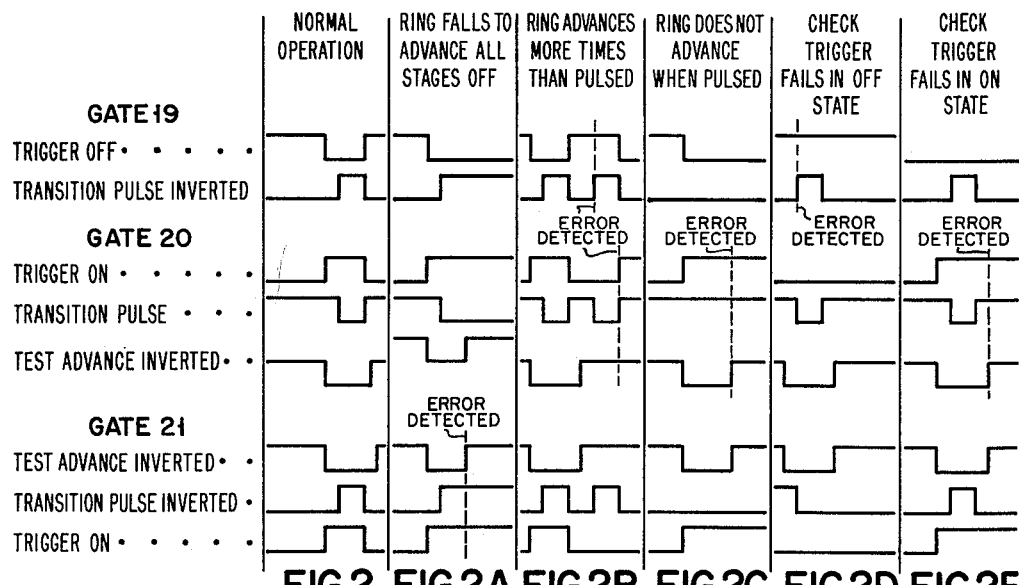
FIG. 2 is a wave form chart illustrative of the wave forms obtained during proper operation of the associated ring counter.
FIG. 2A is a wave chart illustrative of the wave forms developed in the event that all of the bistable devices in the ring counter are off.
FIG. 2B is a wave chart illustrative of the wave forms developed in the event that the associated ring advances more times than pulsed.
FIG. 2C is a wave chart illustrative of the wave forms developed in the event that the associated ring counter does not advance when pulsed.
FIG. 2D is a wave chart illustrative of the wave forms developed in the event the checking trigger fails in the OFF state.
FIG. 2E is a wave chart illustrative of the wave forms developed in the event that the checking trigger fails in the ON state.

In normal operation an advance pulse is applied to stages 0 through $n$ of the ring counter 1 to produce, as previously explained, a transition pulse as shown in FIG. 2 at terminal 7. At the same time a test advance pulse, which may be identical to the advance pulses applied to the ring 1, is applied to the test advance line 27. As previously stated, the test advance pulse is of a duration which just encompasses the transition pulse appearing at junction 7 from the OR gate 6. The positive going edge of the test advance pulse applied to line 27 causes the check trigger 8 to turn on which, as shown in FIG. 2, causes lines 13 and 16 to go high. Check trigger 8 will stay on causing the potential on the ON output terminal to stay high until the transition pulse appearing at junction 7 starts to rise from its negative value at which time check trigger 8 will be turned off thereby causing the potential on the ON output terminal of check trigger 8 to fall producing a pulse as shown in FIG. 2. Considering FIG. 2, it can be seen that during normal operation the wave forms appearing at the inputs to gates 19, 20 and 21 are such that at no time will all of the inputs to the respective gates 19, 20 and 21 be positive to thereby provide an error signal through OR gate 25 onto error line 26.

Considering next the wave forms appearing at the inputs to AND gates 19, 20 and 21 when the associated ring 1 fails to advance leaving all of the stages off, it can be seen that gate 21 will come true thereby providing an error indication on line 26 when the inverted test advance pulse appearing on input 18 rises. As is obvious from a consideration of the wave forms associated with gate 21 in FIG. 2A, it can be seen that at the time the inverted test advance pulse rises the inverted transition pulse is at a high potential and the potential on the ON terminal of the check trigger 8 is still high since the transition pulse did not go positive and thereby reset the check trigger 8.

The wave forms appearing at the inputs of the AND gates 19, 20 and 21 when the associated ring 1 advances more times than pulsed are shown in FIG. 2B. As previously stated, the trigger is turned on by the positive going edge of the test advance pulse and is turned off by the positive going edge of the transition pulse. When the associated ring 1 advances more times than pulsed, another transition pulse is generated and the positive going portion of the transition pulse turns the binary connected check trigger on again causing the potential on the ON output line to rise. Thus, gate 20 goes true at the positive going edge of the transition pulse which again turns check trigger 8 on. Considering also gate 19, it will be seen that an error signal will also be generated by gate 19 when the associated ring advances more times than pulsed when the inverted transition pulse rises.

The wave forms appearing at the inputs to gates 19, 20 and 21 when the associated ring 1 does not advance when pulsed are shown in FIG. 2C. Considering the wave forms associated with gate 20, it can be seen that when the advance pulse applied to the associated ring counter 1 does not turn the particular bistable device which was on to the OFF state, no transition pulse is provided, rather the output of the OR gate 6 appearing at junction 7 remains high. Additionally, the check trigger 8 which was turned on by the positive going portion of the test advance pulse remains on with the potential on the ON output terminal high. Thus, it can be seen that when the inverted test advance pulse rises from its negative value gate 20 comes true and an error is detected through OR gate 25 on error line 26.

FIGS. 2D and 2E show the wave forms generated when the check trigger 8 fails to function properly. As shown in FIG. 2D, when the check trigger fails in the OFF state, the OFF output line will be high and AND gate 19 will go true when the inverted transition pulse rises. When the check trigger 8 fails in the ON state AND gate 20 will come true when the inverted test advance rises since the check trigger ON and the transition pulse line 14 are both high.

In summary, the basic operation of the ring counter 1 is such that an advance pulse turns the bistable devices 0 through $n$ in the ring to the OFF state. The change of state of the one bistable device that was on is sensed and used to turn the next bistable device in succession to the ON state, effectively advancing the ring 1. Prior to the time that the following device turns on and after the preceding bistable device is turned off, all of the devices in the ring 1 are in the OFF state for a definite duration. This time is equal to the transition times of the two devices involved. All of the bistable devices in the ring counter 1 are tied to an OR circuit 6 and thus, the transition signal appears as a pulse on the output 7 of the OR circuit 6. The positive going edge of the advance pulse used to advance the ring 1 is also used to turn a check trigger 8 to the ON state. The positive going edge of the transition pulse appearing on the output of the OR circuit 6 is used to turn the check trigger to the OFF state. The duration of the advance pulse is such that it just encompasses the time required for the ring 1 to advance one step. The output of the check trigger 8, the advance pulse, and the transition pulse are employed in various combinations as inputs to AND gates 19, 20 and 21. An output from either of the three AND gates is passed through OR gate 25 appearing as an error indication on error line 26.

In the above described manner, I have provided a simple, highly reliable, inexpensive checking circuit for use in checking the operation of a cascaded, multi-stage device which does not require any external timing other than the ring advance pulse applied to the associated ring. The herein described novel checking circuit provides an error indication in the event that the associated ring advances more times than pulsed, when all of the bistable devices in the associated ring are off, when the associated ring does not advance when pulsed, and when the checking trigger itself is not functioning properly. The above checks or error indications are all provided without reference to a specific sample time such that in the event that a component malfunctions at any time an error indication will be provided.

While the invention has been particularly shown and described with reference to a preferred embodiment thereof, it will be understood by those skilled in the art that various changes in the form and details may be made therein without departing from the spirit and scope of the invention.

What is claimed is:

1. A checking circuit for a signal generator including a plurality of cascaded bistable devices which are caused to sequentially turn on under control of an advance pulse to produce a transition pulse under normal conditions on the output of an OR gate connected thereto comprising:
- test advance pulse means,
- a checking trigger connected to both said OR gate and said test advance pulse means,
- first inverter means connected to said OR gate,
- second inverter means connected to said test advance means,
- first AND means connected to the OFF output terminal of said checking trigger and to said first inverter means,
- second AND means connected to the ON output terminal of said checking trigger, to said OR gate and to said second inverter means, and
- third AND means connected to the ON output terminal of said checking trigger, to said first inverter means and to said second inverter means.

2. A checking circuit for a signal generator including a plurality of cascaded bistable devices which are caused to sequentially turn on under control of an advance pulse to produce a transition pulse under normal conditions on the output of an OR gate connected thereto comprising:
- test advance pulse means,
- a checking trigger connected to both said OR gate and said test advance pulse means which is turned on by said test advance pulse and turned off by said transition pulse,
- first inverter means connected to said OR gate,
- second inverter means connected to said test advance means,
- first AND means connected to the OFF output terminal of said checking trigger and to said first inverter means,
- second AND means connected to the ON output terminal of said checking trigger, to said OR gate and to said second inverter means, and
- third AND means connected to the ON output terminal of said checking trigger, to said first inverter means and to said second inverter means.

3. A checking circuit for a signal generator including a plurality of cascaded bistable devices which are caused to sequentially turn on under control of an advance pulse to produce a transition pulse under normal conditions on the output of an OR gate connected thereto comprising:
- test advance pulse means for producing a pulse of opposite polarity from the polarity of said transition pulse,
- a checking trigger connected to both said OR gate and said test advance pulse means,
- first inverter means connected to said OR gate,
- second inverter means connected to said test advance means,
- first AND means connected to the OFF output terminal of said checking trigger and to said first inverter means,
- second AND means connected to the ON output terminal of said checking trigger, to said OR gate and to said second inverter means, and
- third AND means connected to the ON output terminal of said checking trigger, to said first inverter means and to said second inverter means.

4. A checking circuit for a signal generator including a plurality of cascaded bistable devices which are caused to sequentially turn on under control of an advance pulse to produce a transition pulse under normal conditions on the output of an OR gate connected thereto comprising:
- test advance pulse means for producing a pulse of opposite polarity from the polarity of said transition pulse,
- a checking trigger connected to both said OR gate and said test advance pulse means which is turned on by said test advance pulse and turned off by said transition pulse,
- first inverter means connected to said OR gate,
- second inverter means connected to said test advance means,
- first AND means connected to the OFF output terminal of said checking trigger and to said first inverter means,
- second AND means connected to the ON output terminal of said checking trigger, to said OR gate and to second inverter means, and
- third AND means connected to the ON output terminal of said checking trigger, to said first inverter means and to said second inverter means.

5. A checking circuit for a signal generator including a plurality of cascaded bistable devices which are caused to sequentially turn on under control of an advance pulse to produce a transition pulse under normal conditions on the output of an OR gate connected thereto comprising:
- test advance pulse means for producing a pulse of opposite polarity from said transition pulse and which slightly encompasses said transition pulse,
- a checking trigger connected to both said OR gate and said test advance pulse means which is turned on by the leading edge of said test advance pulse and turned off by the trailing edge of said transition pulse,
- first inverter means connected to said OR gate,
- second inverter means connected to said test advance means,
- first AND means connected to the OFF output terminal of said checking trigger and to said first inverter means,
- second AND means connected to the ON output terminal of said checking trigger, to said OR gate and to said second inverter means, and
- third AND means connected to the ON output terminal of said checking trigger, to said first inverter means and to said second inverter means.

6. A checking circuit for a signal generator including a plurality of cascaded bistable devices which are caused to sequentially turn on under control of an advance pulse to produce a negative transition pulse under normal conditions on the output of an OR gate connected thereto comprising:
- test advance pulse means for producing a positive test advance pulse which slightly encompasses said negative transition pulse,
- a checking trigger connected to both said OR gate and said test advance pulse means which is turned on by the positive going edge of said test advance pulse and turned off by the positive going edge of said transition pulse,
- first inverter means connected to said OR gate,
- second inverter means connected to said test advance means,
- first AND means connected to the OFF output terminal of said checking trigger and to said first inverter means,
- second AND means connected to the ON output terminal of said checking trigger, to said OR gate and to said second inverter means, and
- third AND means connected to the ON output terminal of said checking trigger, to said first inverter means and to said second inverter means.

References Cited by the Examiner

UNITED STATES PATENTS 3,017,620   1/62   Abzug _____ 340—146.1

MALCOLM A. MORRISON, *Primary Examiner.*